(12) United States Patent
Chen et al.

(10) Patent No.: US 9,979,831 B2
(45) Date of Patent: May 22, 2018

(54) METHOD FOR CELLULAR TEXT TELEPHONE MODEM OPERATION WITH SAMPLING RATE CONVERSION AND MACHINE READABLE MEDIUM

(71) Applicant: MEDIATEK INC., Hsin-Chu (TW)

(72) Inventors: Ting-Ni Chen, New Taipei (TW); Fu-Shing Ju, Keelung (TW); Chih-Ping Lin, Hsinchu County (TW); Yu-Hsin Chen, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days. days.

(21) Appl. No.: 14/846,846

(22) Filed: Sep. 7, 2015

(65) Prior Publication Data

US 2016/0295024 A1 Oct. 6, 2016

Related U.S. Application Data

(60) Provisional application No. 62/139,920, filed on Mar. 30, 2015.

(51) Int. Cl.
| H04M 1/66 | (2006.01) |
| H04M 1/68 | (2006.01) |
| H04M 3/16 | (2006.01) |
| H04M 11/06 | (2006.01) |
| H04L 1/00 | (2006.01) |
| H04M 1/725 | (2006.01) |
| H04W 4/18 | (2009.01) |
| H04M 3/42 | (2006.01) |

(52) U.S. Cl.
CPC ........ *H04M 11/066* (2013.01); *H04L 1/0014* (2013.01); *H04M 1/72591* (2013.01); *H04M 3/42382* (2013.01); *H04W 4/18* (2013.01); *H04M 3/42391* (2013.01)

(58) Field of Classification Search
CPC ........... H04M 11/066; H04M 1/72591; H04M 3/42391; H04L 1/0014; H04W 4/18
See application file for complete search history.

(56) References Cited

U.S. PATENT DOCUMENTS

| 7,702,319 B1* | 4/2010 | Arslan | H04M 3/42391 379/88.13 |
| 2004/0152418 A1* | 8/2004 | Sinha | H04L 27/0002 455/42 |
| 2006/0020450 A1* | 1/2006 | Miseki | G10L 19/18 704/219 |
| 2006/0258400 A1* | 11/2006 | Lee | H04M 1/72527 455/557 |
| 2006/0276218 A1* | 12/2006 | Goris | H04M 1/72591 455/550.1 |
| 2014/0347094 A1* | 11/2014 | Hsieh | H03K 19/017509 326/37 |

* cited by examiner

Primary Examiner — Nguyen Vo
(74) Attorney, Agent, or Firm — Han IP Corporation; Andy M. Han (57) ABSTRACT

A method for Cellular Text Telephone Modem (CTM) signal transmission includes: converting a CTM transmitter signal carried in a first sampling rate to generate a transmission signal carried in a second sampling rate, wherein the second sampling rate is different from the first sampling rate; and outputting the transmission signal carried in the second sampling rate to a CTM receiver.

16 Claims, 6 Drawing Sheets

METHOD FOR CELLULAR TEXT TELEPHONE MODEM OPERATION WITH SAMPLING RATE CONVERSION AND MACHINE READABLE MEDIUM

CROSS REFERENCE TO RELATED APPLICATIONS

This application claims the benefit of U.S. Provisional Application No. 62/139,920 filed on Mar. 30, 2015, the contents of which are incorporated herein by reference.

BACKGROUND

The present disclosure relates to signal transmission/reception, and more particularly, to a method for Cellular Text Telephone Modem (CTM) operation with sampling rate conversion, and a related machine readable medium.

A text telephone (TTY) is one of the most commonly used applications by people who are not capable of communicating orally/aurally over the telephone. TTY is a device that uses texts (text signals) instead of voice (speech signals) to communicate over a telephone network. This enables people with hearing or speech difficulties to converse on the phone by typing messages; the signal generated by TTY is then transmitted to a Cellular Text telephone Modem (CTM) which allows a reliable transmission of text characters via the speech channel of a cellular phone system.

CTM can only work in a narrowband frequency. Conventionally, the signal generated from the CTM for transmission over the telephone network is in a low sampling rate (e.g. 8K), which results in poor communication quality. Thus, one cannot benefit from better communication quality under higher sampling rates.

SUMMARY

One of the objectives of the present disclosure is therefore to provide a method for CTM operation which can adjust the sampling rates of the CTM signal to solve the above-mentioned problem.

According to an implementation of the present disclosure, a method for Cellular Text Telephone Modem (CTM) signal transmission is disclosed, wherein the method comprises: converting a CTM transmitter signal carried in a first sampling rate to generate a transmission signal carried in a second sampling rate, wherein the second sampling rate is different from the first sampling rate; and outputting the transmission signal carried in the second sampling rate.

According to an implementation of the present disclosure, a method for Cellular Text Telephone Modem (CTM) signal reception is disclosed, wherein the method comprises: receiving a transmission signal carried in a second sampling rate frequency; and converting the transmission signal carried in the second sampling rate to generate a CTM receiver signal carried in a first sampling rate, wherein the first sampling rate is different from the second sampling rate.

According to an implementation of the present disclosure, a non-transitory machine readable medium having a program code stored therein is disclosed, wherein when executed by a processor, the program code instructs the processor to perform the following steps: converting a Cellular Text Telephone Modem (CTM) transmitter signal carried in a first sampling rate to generate a transmission signal carried in a second sampling rate, wherein the second sampling rate is different from the first sampling rate; and outputting the transmission signal carried in the second sampling rate According to an implementation of the present disclosure, a non-transitory machine readable medium having a program code stored therein, wherein when executed by a processor, the program code instructs the processor to perform the following steps: receiving a transmission signal carried in a second sampling rate frequency; and converting the transmission signal carried in the second sampling rate to generate a Cellular Text Telephone Modem (CTM) receiver signal carried in a first sampling rate, wherein the first sampling rate is different from the second sampling rate.

These and other objectives of the present disclosure will no doubt become obvious to those of ordinary skill in the art after reading the following detailed description of the implementations that are illustrated in various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
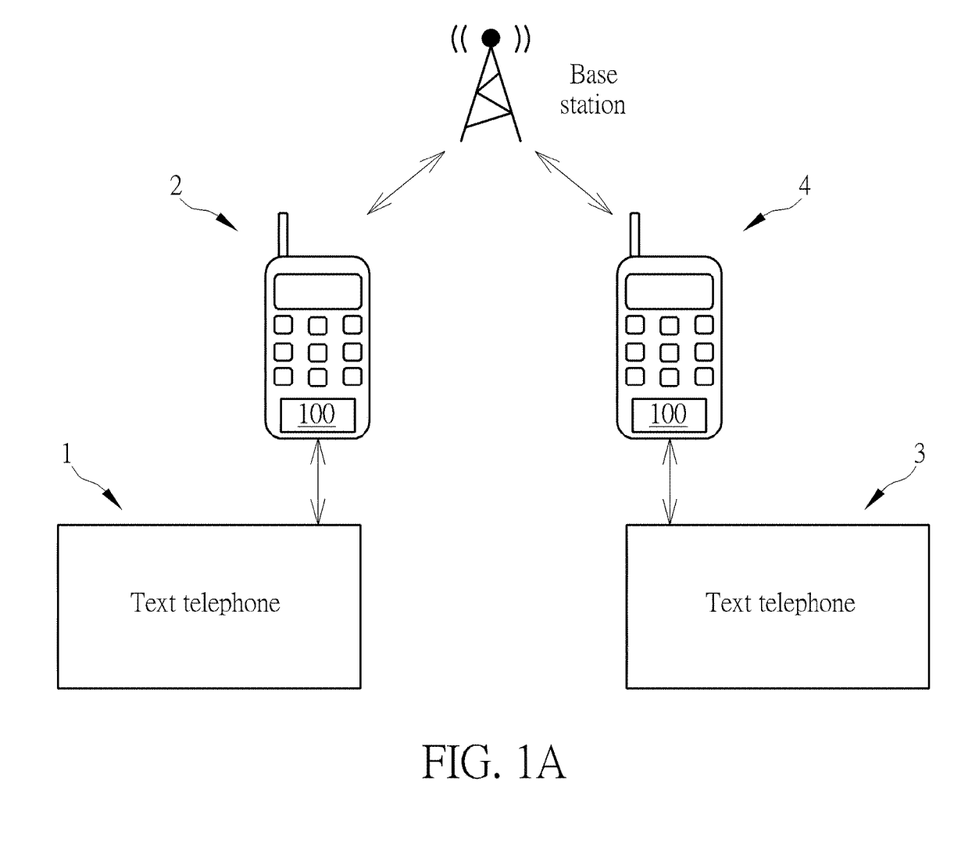
FIG. 1A is a diagram illustrating an application of the CTM transceiver module according to an implementation of the present disclosure.
Figure 1B:
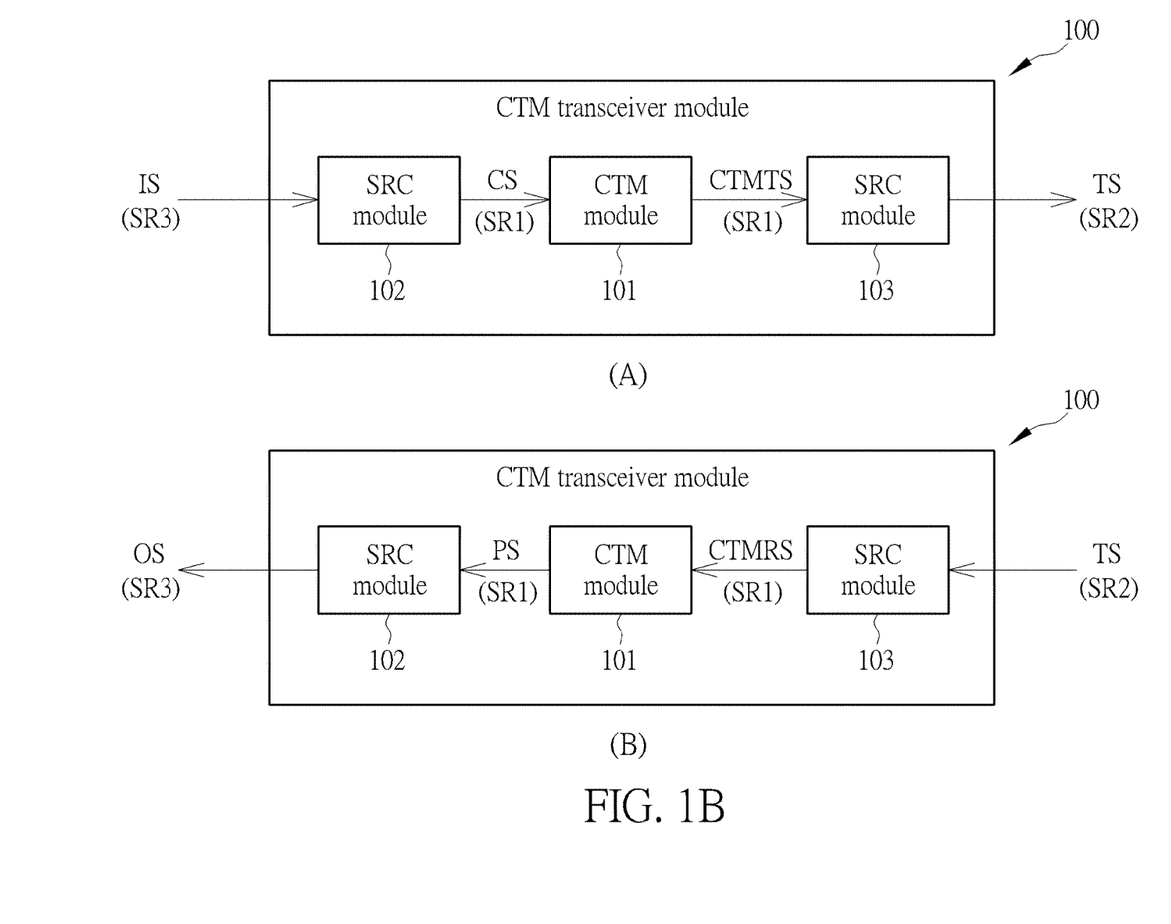
FIG. 1B is a diagram illustrating a CTM transceiver module according to an implementation of the present disclosure.

FIG. 1A is a diagram illustrating an application of the CTM transceiver module 100 according to an implementation of the present disclosure. As shown in FIG. 1A, the mobile phones 2, 4 are connected to the text telephones 1, 3 respectively, wherein the connection between the mobile phones and the text telephones may be through a psychical cable or in other approaches which is not limited in the present disclosure. Through each connection between the mobile phones 2, 4 and the text telephones 1, 3, the text signal sent from the text telephones 1, 3 can be transmitted in a higher sampling rate for better quality via the CTM transceiver module 100 comprised in the mobile phones 2, 4. FIG. 1B is a diagram illustrating a CTM transceiver module 100 according to an implementation of the present disclosure. As shown in FIG. 1B, the CTM transceiver module 100 comprises a CTM module 101 and at least one sampling rate conversion (SRC) module (e.g. two SRC modules 102 and 103 in this implementation), wherein the CTM module 101 is a conventional CTM, and the SRC modules 102 and 103 are arranged to adjust sampling rate of signals. For example, the CTM transceiver module 100 may be a software module executable on a processor-based system. The sub-diagram (A) of FIG. 1B illustrates the operation of the CTM transceiver module 100 being part of a transmitter for transmitting signals. In the sub-diagram (A) of FIG. 1B, the CTM transceiver module 100 receives an input signal IS carried in a sampling rate SR3, wherein the input signal IS maybe a text telephone signal or a speech signal. The SRC module 102 generates a converted signal CS carried in a sampling rate SR1 to the CTM module 101 according to the input signal IS, wherein the sampling rate SR1 is a frequency in which the CTM module 101 can process, e.g. 8 KHz. The CTM module 101 processes the converted signal CS carried in the sampling rate SR1 to generate a CTM transmitter signal CTMTS carried in the sampling rate SR1 to the SRC module 103. The SRC module 103 converts the CTM transmitter signal CTMTS carried in the sampling rate SR1 to generate a transmission signal TS carried in a sampling rate SR2. In this way, even if the CTM module 101 can only process signals carried in the sampling rate SR1, e.g. 8 KHz, the proposed disclosure can still deal with input signals carried in an arbitrary frequency higher or lower than the working frequency of the CTM module 101.

The sub-diagram (B) of FIG. 1B illustrates the operation of the CTM transceiver module 100 being part of a receiver for receiving signals. As shown in the sub-diagram (B) of FIG. 1B, the SRC module 103 converts the transmission signal TS carried in the sampling rate SR2 to generate a CTM receiver signal CTMRS carried in the sampling rate SR1 to the CTM module 101. The CTM module 101 processes the CTM receiver signal CTMRS carried in the sampling rate SR1 to generate a processed signal PS carried in the sampling rate SR1. The SRC module 102 converts the processed signal PS carried in the sampling rate SR1 to generate an output signal OS carried in the sampling rate SR3. It should be noted that the sampling rates SR2 and SR3 are decided by a negotiation module (not shown in FIG. 1B) negotiating with a base station before the communication starts, and the sampling rates SR2 and SR3 are usually the same. Nowadays, signals to be transmitted maybe carried in either 8 KHz, 16 KHz, 32 KHz, or 48 KHz; therefore, the present disclosure can enable the signals which have been processed by the CTM module 101 to be transmitted in a higher sampling rate, which improves the communication quality and experience for users.

Figure 2:
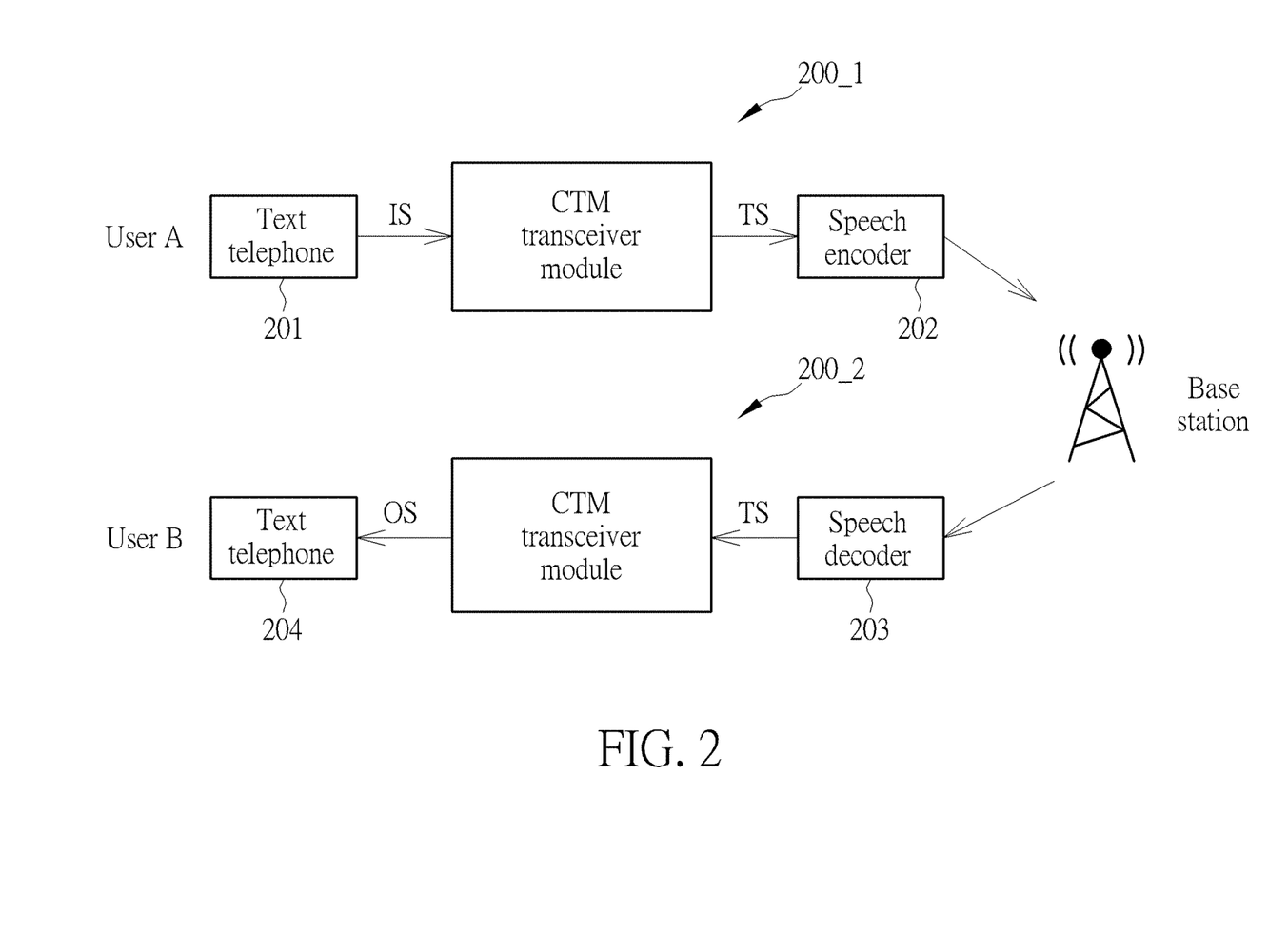
FIG. 2 is a diagram illustrating a CTM communication progress according to an implementation of the present disclosure.

FIG. 2 is a diagram illustrating a CTM communication progress according to an implementation of the present disclosure. As shown in FIG. 2, the uplink is a path for the CTM transceiver module 200_1 being part of a transmitter to transmit signals and the downlink is a path for the CTM transceiver module 200_2 being part of a receiver to receive signals. Both CTM transceiver modules 200_1 and 200_2 may be implemented using the CTM transceiver module 100 shown in FIG. 1. Text phones can operate in three modes: the full mode, the Voice Carry Over (VCO) mode, and the Hearing Carry Over (HCO) mode. In the full mode, both the user A and the user B shown in FIG. 2 are allowed to transmit text signals via text telephones 201 and 204. In this case, the user A transmits a text signal (i.e. the input signal IS) by typing on the text telephone 201. The CTM transceiver module 200_1 processes the input signal IS to generate a transmission signal TS to a backend speech encoder 202. The transmission signal TS is then transmitted to the receiver end through a base station (i.e. the downlink shown in FIG. 2). Through a speech decoder 203 at the receiver end, the transmission signal TS is sent to the CTM transceiver module 200_2 for further processing. The CTM transceiver module 200_2 generates an output signal OS according to the transmission signal TS. In this case, the output signal OS is the text signal and will be shown on the text telephone 204 for the user B. If the user B wants to communicate with the user A in a text signal, it will follow the same process described above, and the text signal will be shown on the text telephone 201 for the user A. It should be noted that sampling rates of the input signal IS, the output signal OS and the transmission signal TS are predetermined by negotiating with the base station before the communication is started, and might be higher than the working frequency of the conventional CTM. Therefore, the quality of the communication will be improved greatly due to the proposed sampling rate conversion.

Figure 3:
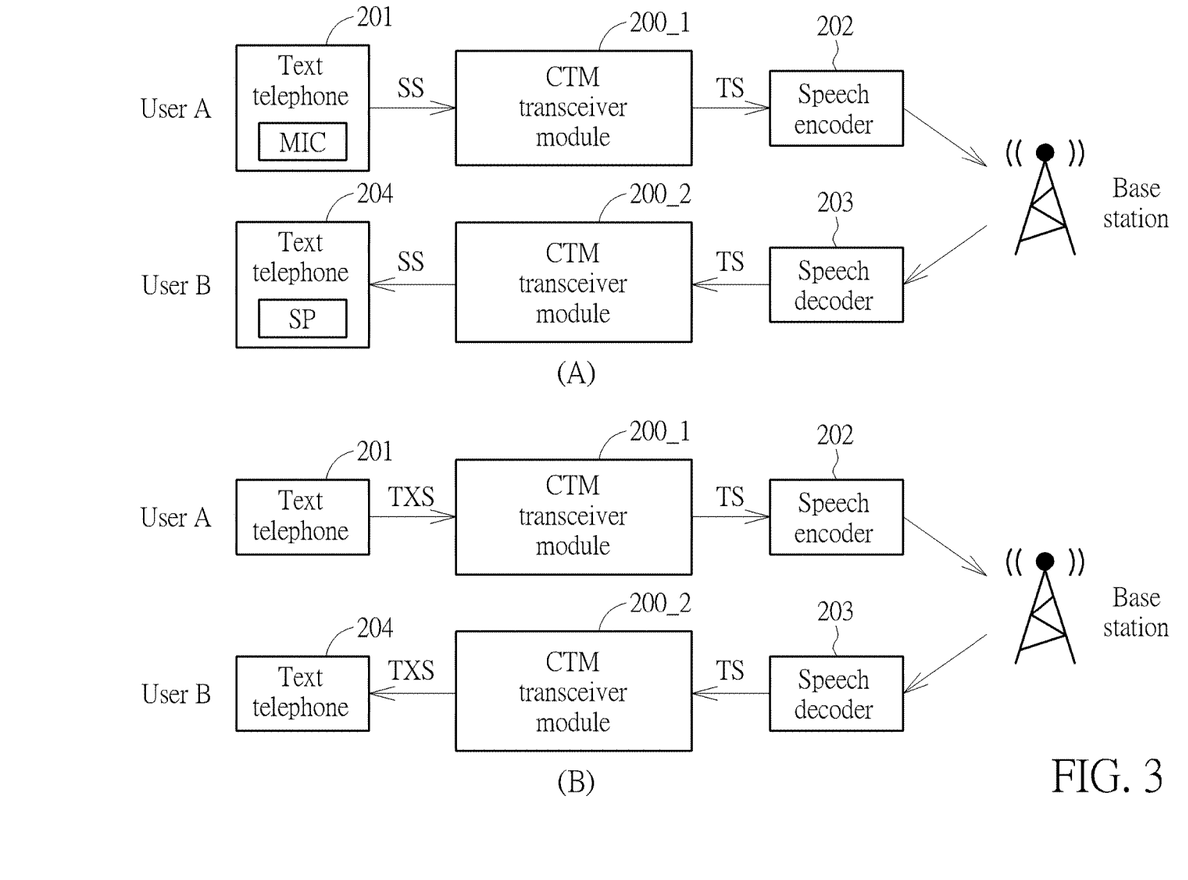
FIG. 3 is a diagram illustrating the VCO mode and the HCO mode of the text phone according to an implementation of the present disclosure.

FIG. 3 is a diagram illustrating the VCO mode and the HCO mode of the text phone according to an implementation of the present disclosure. As shown in the sub-diagram (a) of FIG. 3, in the VCO mode, a user A uses a microphone MIC of the text telephone 201 to transmit a speech signal SS and a user B receives the speech signal SS via a speaker SP of the text telephone 204. As shown in the sub-diagram (B) of FIG. 3, in the HCO mode, a user A transmits a text signal TXS via the text telephone 201 which will be shown on the text telephone 204 for a user B for communicating. The communication process of both the VCO mode and the HCO mode are identical to the above-mentioned communication process of the full mode; a detailed description is thus omitted here for brevity.

Figure 4:
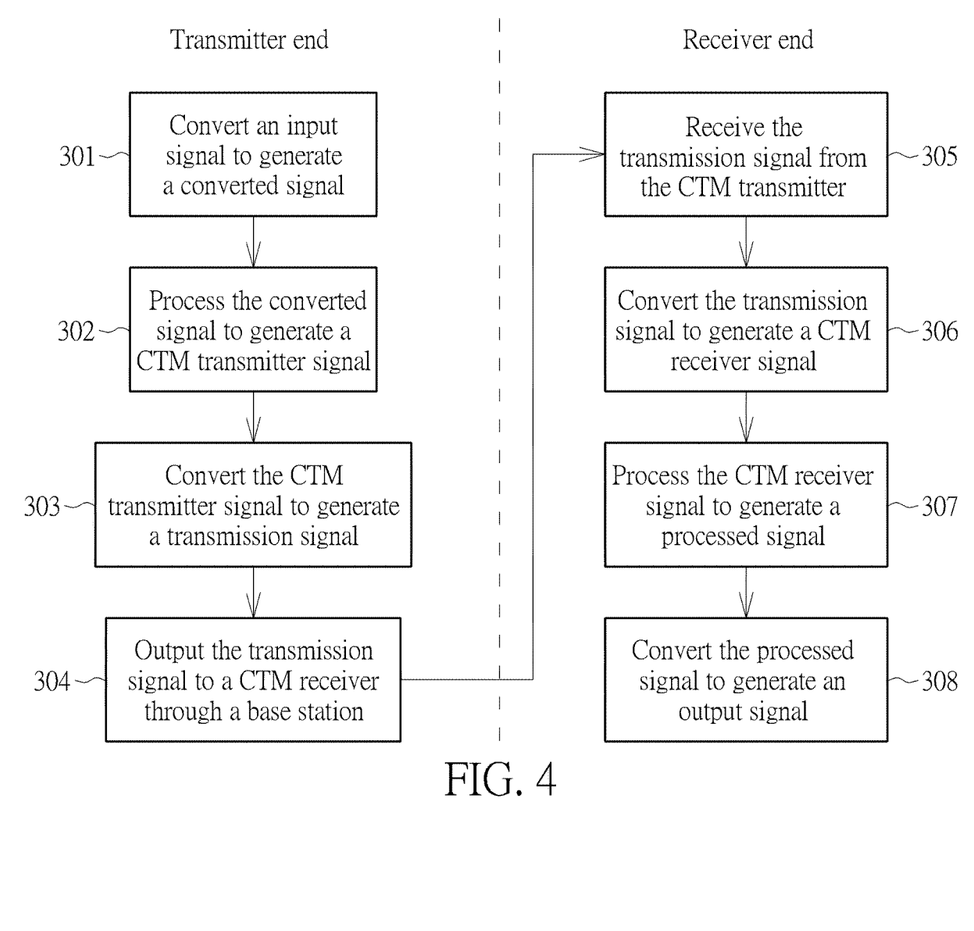
FIG. 4 is a flowchart illustrating an operating flow of the CTM transceiver module according to an implementation of the present disclosure.

FIG. 4 is a flowchart illustrating an operating flow of a CTM transceiver module according to an implementation of the present disclosure, wherein steps 301 to 304 are operated by one CTM transceiver module (e.g. 200_1) being part of a CTM transmitter and steps 305 to 308 are operated by another CTM transceiver module (e.g. 200_2) being part of a CTM receiver. The flow is described as follows.

Step 301: Convert an input signal to generate a converted signal. (In this step, the input signal is carried in a third sampling rate which is different from a first sampling rate having a frequency in which only the CTM can work (e.g. 8 KHz), and the converted signal is carried in the first sampling rate. The input signal maybe a speech signal or a text signal.)

Step 302: Process the converted signal to generate a CTM transmitter signal.

Step 303: Convert the CTM transmitter signal to generate a transmission signal.

Step 304: Output the transmission signal to a CTM receiver through a base station.

The transmission signal is carried in a second sampling rate which is different from the first sampling rate. Due to the second sampling rate usually being higher than the first sampling rate, the transmission signal is thus transmitted with a better quality. The second sampling rate and the third sampling rate are determined by negotiating with the base station before the communication is started.

Step 305: Receive the transmission signal from the CTM transmitter.

Step 306: Convert the transmission signal to generate a CTM receiver signal.

(In this step, the CTM receiver signal is carried in the first sampling rate for being processed in the CTM module 101.)

Step 307: Process the CTM receiver signal to generate a processed signal.

Step 308: Convert the processed signal to generate an output signal.

In Step 308, the output signal is carried in the third sampling rate. Likewise, the second sampling rate and the third sampling rate in the receiver end are determined by negotiating with the base station before the communication is started. In this way, even if the CTM can only process signals carried in a specific sampling rate, e.g. 8 KHz, the proposed disclosure can still deal with input signals carried in an arbitrary frequency, which improves the communication quality.

Figure 5:
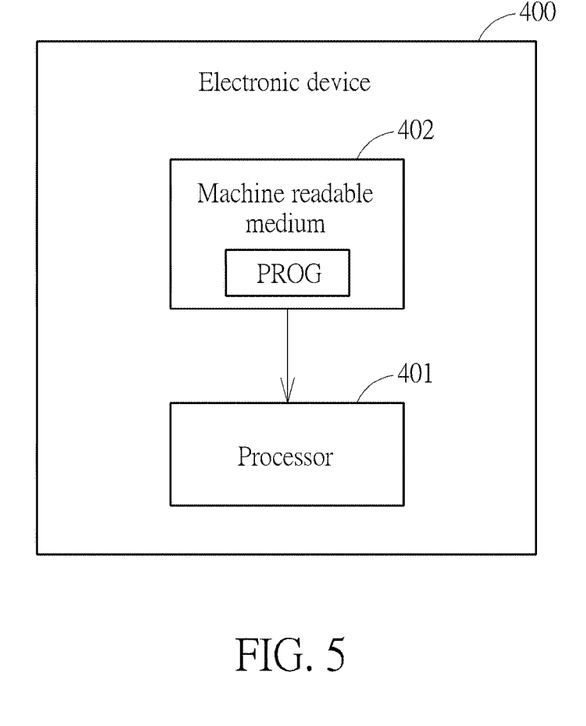
FIG. 5 is a diagram illustrating an electronic device using the CTM transceiver module according to an implementation of the present disclosure.

The CTM transceiver module 100/200_1/200_2 of the present disclosure may be implemented as a program code and can be stored in a non-transitory machine readable medium of an electronic device such as a smart phone, a tablet or a laptop. The implementation of FIG. 2 can be implemented by coupling the electronic device with a text telephone (e.g. the text telephones 201 and 204) to transmit a speech signal or a text signal having improved quality. FIG. 5 is a diagram illustrating an electronic device 400 according to an implementation of the present disclosure. As shown in FIG. 5, the electronic device 400 comprises a processor 401 and a non-transitory machine readable medium 402, wherein the non-transitory machine readable medium 402 stores a program code PROG. The non-transitory machine readable medium 402 maybe a volatile memory or a non-volatile memory. In this implementation, the electronic device 400 is coupled to a text telephone to perform a CTM signal transmission/reception. The flow described in the implementation of FIG. 4 will be executed if the program code PROG stored in the non-transitory machine readable medium 402 is loaded and executed by the processor 401. The person skilled in the art should understand the implementation readily after reading the above paragraphs; a detailed description is thus omitted here for brevity.

Briefly summarized, the present disclosure discloses a method for CTM operation, wherein a sampling rate of a signal to be transmitted is adjusted. Even if the conventional CTM can only process a signal with specific sampling rate, e.g. 8 KHz, the disclosure can still deal with input signals carried in an arbitrary frequency, which improves the quality and experience for users.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method for Cellular Text Telephone Modem (CTM) signal transmission, comprising:
   converting, by a processor implementing a CTM function, a CTM transmitter signal carried in a first sampling rate to generate a transmission signal carried in a second sampling rate, wherein the second sampling rate is different from the first sampling rate;
   outputting, by the processor, the transmission signal carried in the second sampling rate;
   converting, by the processor, an input signal carried in a third sampling rate to generate a converted signal carried in the first sampling rate, wherein the third sampling rate is different from the first sampling rate; and
   processing, by the processor, the converted signal carried in the first sampling rate to generate the CTM transmitter signal carried in the first sampling rate.

2. The method of claim 1, wherein the third sampling rate is equal to the second sampling rate.

3. The method of claim 1, wherein the input signal is a speech signal or a text telephone signal.

4. The method of claim 1, wherein the second sampling rate and the third sampling rate are determined by a base station.

5. A method for Cellular Text Telephone Modem (CTM) signal reception, comprising:
   receiving, by a processor implementing a CTM function, a transmission signal carried in a second sampling rate frequency;
   converting, by the processor, the transmission signal carried in the second sampling rate to generate a CTM receiver signal carried in a first sampling rate, wherein the first sampling rate is different from the second sampling rate;
   processing, by the processor, the CTM receiver signal carried in the first sampling rate to generate a processed signal carried in the first sampling rate; and
   converting, by the processor, the processed signal carried in the first sampling rate to generate an output signal carried in a third sampling rate.

6. The method of claim 5, wherein the third sampling rate is equal to the second sampling rate.

7. The method of claim 5, wherein the output signal is a speech signal or a text telephone signal.

8. The method of claim 5, wherein the second sampling rate and the third sampling rate are determined by a base station.

9. A non-transitory machine-readable medium having a program code stored therein, wherein when executed by a processor, the program code instructs the processor to perform the following steps:
   converting, by the processor implementing a Cellular Text Telephone Modem (CTM) function, a CTM transmitter signal carried in a first sampling rate to generate a transmission signal carried in a second sampling rate, wherein the second sampling rate is different from the first sampling rate;
   outputting, by the processor, the transmission signal carried in the second sampling rate;
   converting, by the processor, an input signal carried in a third sampling rate to generate a converted signal carried in the first sampling rate, wherein the third sampling rate is different from the first sampling rate; and
   processing, by the processor, the converted signal carried in the first sampling rate to generate the CTM transmitter signal carried in the first sampling rate.

10. The non-transitory machine-readable medium of claim 9, wherein the third sampling rate is equal to the second sampling rate.

11. The non-transitory machine-readable medium of claim 9, wherein the input signal is a speech signal or a text telephone signal.

12. The non-transitory machine-readable medium of claim 9, wherein the second sampling rate and the third sampling rate are determined by a base station.

13. A non-transitory machine-readable medium having a program code stored therein, wherein when executed by a processor, the program code instructs the processor to perform the following steps:
- receiving, by the processor implementing a Cellular Text Telephone Modem (CTM) function, a transmission signal carried in a second sampling rate frequency from a CTM transmitter;
- converting, by the processor, the transmission signal carried in the second sampling rate to generate a CTM receiver signal carried in a first sampling rate, wherein the first sampling rate is different from the second sampling rate;
- processing, by the processor, the CTM receiver signal carried in the first sampling rate to generate a processed signal carried in the first sampling rate; and
- converting, by the processor, the processed signal carried in the first sampling rate to generate an output signal carried in a third sampling rate.

14. The non-transitory machine-readable medium of claim 13, wherein the third sampling rate is equal to the second sampling rate.

15. The non-transitory machine-readable medium of claim 13, wherein the output signal is a speech signal or a text telephone signal.

16. The non-transitory machine-readable medium of claim 13, wherein the second sampling rate and the third sampling rate are determined by a base station.

* * * * *